US005560283A

United States Patent [19]

Hannig

[11] Patent Number: 5,560,283

[45] Date of Patent: Oct. 1, 1996

[54] PISTON-CYLINDER ASSEMBLY OF AN INTERNAL COMBUSTION ENGINE

[75] Inventor: Christoph Hannig, Stuttgart, Germany

[73] Assignee: Mahle GmbH, Stuttgart, Germany

[21] Appl. No.: 446,878

[22] PCT Filed: Oct. 12, 1993

[86] PCT No.: PCT/DE93/00977

§ 371 Date: May 26, 1995

§ 102(e) Date: May 26, 1995

[87] PCT Pub. No.: WO94/12783

PCT Pub. Date: Jun. 9, 1994

[30] Foreign Application Priority Data

Nov. 28, 1992 [DE] Germany .......................... 42 40 050.3

[51] Int. Cl.[6] .......................... F16J 1/04

[52] U.S. Cl. .......................... 92/223; 92/208

[58] Field of Search .................. 92/222, 223; 123/193.6

[56] References Cited

U.S. PATENT DOCUMENTS

| | | | |
|---|---|---|---|
| 3,935,797 | 2/1976 | Niimi et al. . | |
| 4,230,027 | 10/1980 | Promeyrat | 92/223 |
| 4,757,790 | 7/1988 | Ushio et al. . | |
| 4,831,977 | 5/1989 | Presswood | 123/193.6 |
| 5,085,185 | 2/1992 | Heshmat | 123/193.6 |
| 5,257,603 | 11/1993 | Bauer et al. | 92/223 |
| 5,314,717 | 5/1994 | Alt | 92/223 |

FOREIGN PATENT DOCUMENTS

| | | |
|---|---|---|
| 0005910 | 12/1979 | European Pat. Off. . |
| 0466978 | 1/1992 | European Pat. Off. . |
| 3114124 | 10/1982 | Germany . |
| 3506747 | 9/1985 | Germany . |
| 4113773 | 1/1992 | Germany . |
| 4133546 | 4/1993 | Germany . |
| 63-289373 | 11/1988 | Japan . |
| 1-253553 | 10/1989 | Japan . |
| 4-189465 | 7/1992 | Japan . |

OTHER PUBLICATIONS

Motortechnische Zeitschrift 34; (1973), Book 2, pp. 49 to 51.

*Primary Examiner*—Thomas E. Denion
*Attorney, Agent, or Firm*—Collard & Roe, P.C.

[57] ABSTRACT

A piston having at least one piston ring in combination with a cylinder of a two-stroke internal combustion engine. The piston is made from an aluminum alloy and has a running layer covering at least 80% of the running surface of the piston. The running layer is made from resin-bound graphite. The piston ring has a crowned running surface and is made from cast iron or steel. The cylinder includes a running surface where at least the running surface is made from an aluminum alloy. The running surface has a roughness of less than 1 micron. The running layer on the piston has a thickness between 10 and 20 microns. The graphite particles which form the running layer have a size between 1 and 10 microns.

15 Claims, 1 Drawing Sheet

PISTON-CYLINDER ASSEMBLY OF AN INTERNAL COMBUSTION ENGINE

BACKGROUND OF THE INVENTION

1. Field of the Invention

The invention relates to the running surfaces of a piston and a cylinder of an internal combustion engine.

2. The Prior Art

With piston-cylinder assemblies of said known type, the running layer of the piston is normally a metallic-type layer which is applied galvanically.

Based on the above, the invention deals with the problem of creating an economically producible piston running layer, whose properties are at least equal to the coatings applied galvanically heretofore.

SUMMARY OF THE INVENTION

A solution to said problem is provided, according to the invention by a piston having at least one piston ring in combination with a cylinder of a two-stroke internal combustion engine. The piston-cylinder combination is comprised of a piston made from an aluminum alloy including a running surface with a running layer covering at least 80% of said running surface. The running layer is made from resin-bound graphite. The piston ring has a crowned running surface and is made from cast iron or steel. The cylinder includes a running surface where at least the running surface is made from an aluminum alloy, wherein the running surface has a roughness of $R_a$ of less than one (1) micron.

Alternatively, the roughness $R_a$ is less than eight-tenths (0.8) of a micron or less than one-half (0.5) of a micron. In a further embodiment, the roughness $R_a$ is less than or equal to three-tenths (0.3) of a micron. The aluminum alloy forming the running surface of the cylinder is an aluminum-silicon alloy having a silicon content which is greater than eight percent (8%) by weight. The aluminum alloy forming the running surface of the cylinder is an aluminum-silicon-zinc alloy having a silicon component which is greater than five percent (5%) by weight and a zinc component which is greater than two percent (2%) by weight. The running surface of the cylinder is precisely drilled.

The running surface of the piston has a thickness between ten (10) and twenty (20) microns. The resin-bound graphite forming the running layer includes graphite particles having a size between one (1) and ten (10) microns or alternatively, a size between one (1) and five (5) microns. The resin-bound graphite has a graphite content between thirty percent (30%) and sixty percent (60%) or, alternatively a graphite content between forty percent (40%) and sixty percent (60%).

The resin-bound graphite includes a resin vehicle made from curable polyimide. The running layer of said piston is a cured running layer which is cured between 150°–200° C. for between 10–30 minutes. The aluminum alloy forming said piston is an aluminum-silicon alloy.

The $R_a$-value specified in the claims is a value fixed according to the ISO-standard and denotes the arithmetic mean of the peak heights of the surface peaks forming the roughness. The piston-cylinder assembly according to the invention is intended for use particularly in connection with internal combustion engines for lawn mowers, motorized cutters, tractor-drawn cutters, and stationary engines.

BRIEF DESCRIPTION OF THE DRAWING

The drawing is a cross-sectional view through a piston-cylinder assembly according to the invention.

DETAILED DESCRIPTION OF THE PREFERRED EMBODIMENTS

Figure 1:
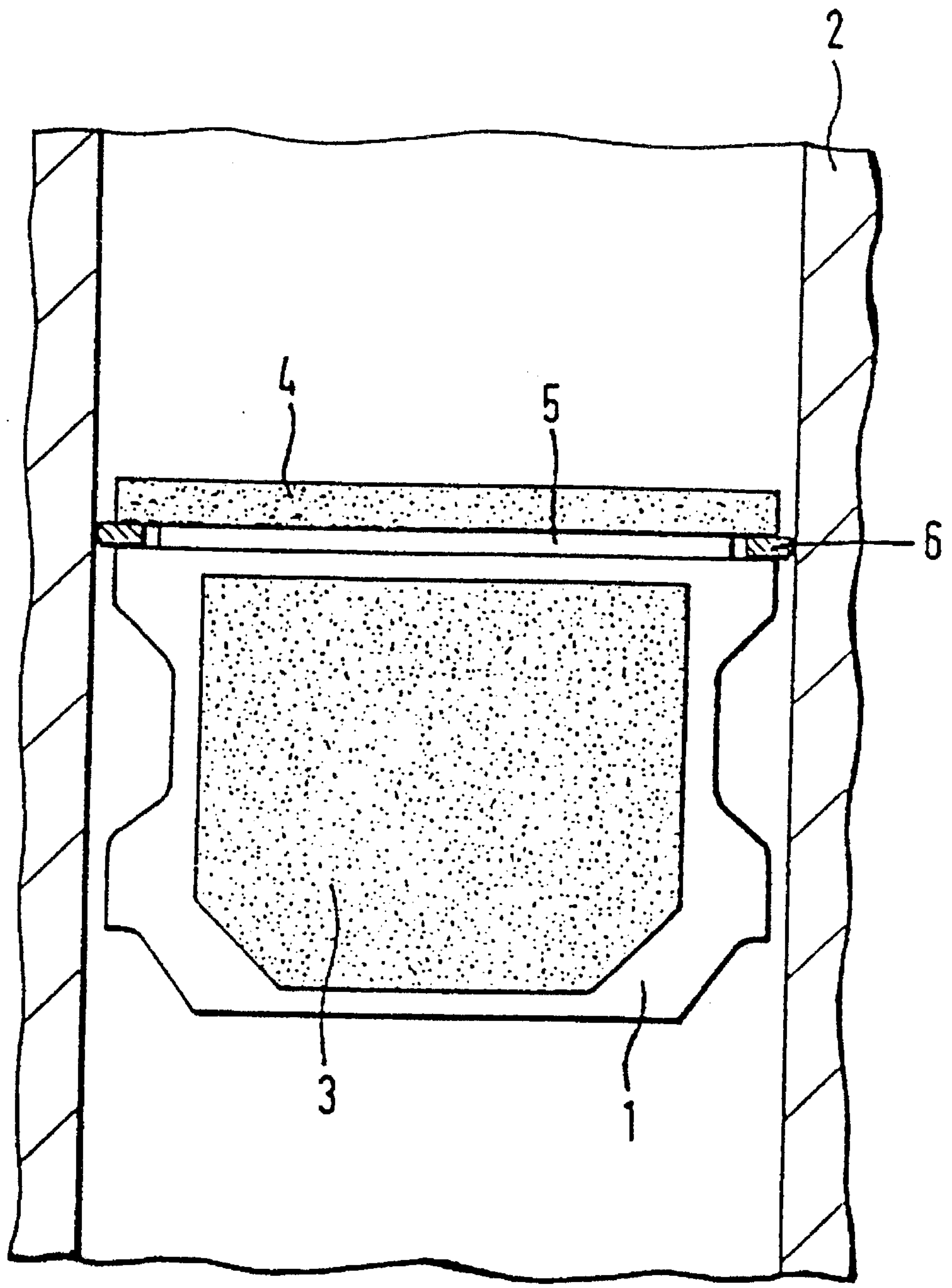

The piston 1 has a diameter of about 42 mm and is guided in a cylinder of a two-stroke engine. The basic material of the piston consists of an aluminum alloy, for example an aluminum-silicon alloy having the following composition stated in percent by weight:

| | |
|---|---|
| Si | 17–19 |
| Cu | 0.8–1.5 |
| Mg | 0.8–1.3 |
| Ni | 0.8–1.3 |
| Fe | less than or equal to 0.7 |
| Mn | less than or equal to 0.2 |
| Ti | less than or equal to 0.2 |
| Zn | less than or equal to 0.3 |
| Al | balance |

A running layer 3 made of graphite bound in resin is applied to each of the supporting zones of the piston skirt. These zones oppose each other in the pressure and counter-pressure directions. A corresponding additional layer 4 can be applied to the top land zone of piston 1. This top land zone is disposed above the (in the present case) single piston ring groove 5. Running layer 3 covers at least 80% of the running surface of the piston.

The running layer 4 in the zone of the top land is optional. If several ring grooves 5 are present, the individual ring lands may be coated as well. The running layers 3 and 4 each have a thickness between 10 and 20 microns both in the skirt and top land zones. The structure and composition of the running layers 3 and 4 are described in the following. The respective coatings are applied according to the screen printing process, which is known in this field.

Within the running layers, the graphite is bound in curable polyimide as the vehicle. The graphite content within the cured layer is between 30% and 60%, ideally between 40% and 60% by weight. The material to be applied by the screen printing process for producing the coating contains a solvent which, for example, may be N-methyl-pyrrolidone (NMP). The solvent component in the starting material of the coating to be applied amounts to about 50 percent by weight. The particle size of the graphite bound in the layer is between 1 and 10 microns and ideally between 1 and 5 microns. The coating applied in the screen printing process is cured for 10–30 minutes between 150°–200°, ideally about 15 minutes at about 200° C.

The material forming the counter running track of the cylinder 1 is an aluminum alloy or an aluminum-silicon alloy having a silicon content which is greater than 8% by weight. Alternatively, the running surface is made from an aluminum-silicon-zinc alloy having a silicon content which is greater than 5% and a zinc content which is greater than 2% by weight. In a specific embodiment, the running surface is made from an aluminum alloy with the following composition stated in percent by weight:

| | |
|---|---|
| Si | 16.0–18.0 |
| Mg | 0.4–0.7 |
| Cu | 4.0–5.0 |
| Fe | less than or equal to 0.7 |

-continued

| | |
|---|---|
| Al | balance |

The running surface of the cylinder 2 is finely drilled and has a roughness $R_a$ of less than 1 micron. In The running surface of the cylinder 2 is finely alternate embodiments, the $R_a$ is less than 0.8 of a micron, less than 0.5 of a micron or less than or equal to 0.3 microns.

The piston ring 6 inserted in the piston ring groove 5 consists of cast iron or steel, for example an STD-material having the following composition stated in percent by weight:

| | |
|---|---|
| C | 3.5–3.9 |
| P | 0.3–0.6 |
| Cu | 0.5 max. |
| Si | 2.4–3.1 |
| S | 0.15 max. |
| Mn | 0.5–0.9 |
| Cr | 0.4 max. |
| Fe | balance |

The geometry of the running surface of the piston ring 6 is crowned. For the dimension of 42×1.5 mm used in the present case, such a piston ring is fixed by the German standard DIN 70910 DI T1 B. The piston-cylinder assembly described above, with a piston with a diameter of about 42 mm, is intended to be used for an output range in the order of magnitude of about 20 to 40 kilowatts/liter.

What is claimed is:

1. A piston having at least one piston ring in combination with a cylinder of a two-stroke internal combustion engine comprising:

a piston made from an aluminum alloy including a running surface with a running layer covering at least 80% of said running surface, said running layer being made from resin-bound graphite;

at least one piston ring with a crowned running surface, said at least one piston ring being made from a material selected from the group consisting of cast iron and steel; and a cylinder including a running surface where at least said running surface is made from an aluminum alloy, wherein said running surface has a roughness of $R_a$ of less than one (1) micron.

2. The combination according to claim 1, wherein the roughness $R_a$ is less than eight-tenths (0.8) of a micron.

3. The combination according to claim 2, wherein the roughness $R_a$ is less than one-half (0.5) of a micron.

4. The combination according to claim 3, wherein the roughness $R_a$ is less than or equal to three-tenths (0.3) of a micron.

5. The combination according to claim 1, wherein the aluminum alloy forming said running surface of said cylinder is an aluminum-silicon alloy having a silicon content greater than eight percent (8%) by weight.

6. The combination according to claim 1, wherein the aluminum alloy forming said running surface of said cylinder is an aluminum-silicon-zinc alloy having (i) a silicon content greater than five percent (5%) by weight, and (ii) a zinc content greater than two percent (2%) by weight.

7. The combination according to claim 1, wherein said running surface of said cylinder is precisely drilled.

8. The combination according to claim 1, wherein said running layer of said piston has a thickness between ten (10) and twenty (20) microns.

9. The combination according to claim 8, wherein the resin-bound graphite forming said running layer includes graphite particles having a size between one (1) and ten (10) microns.

10. The combination according to claim 9, wherein the resin-bound graphite forming said running layer includes graphite particles having a size between one (1) and five (5) microns.

11. The combination according to claim 10, wherein the resin-bound graphite forming said running layer has a graphite content between thirty percent (30%) and sixty percent (60%).

12. The combination according to claim 11, wherein the resin-bound graphite forming said running layer has a graphite content between forty percent (40%) and sixty percent (60%).

13. The combination according to claim 1, wherein the resin-bound graphite includes a resin vehicle made from curable polyimide.

14. The combination according to claim 1, wherein said running layer of said piston is a cured running layer which is cured between 150°–200° C. for between 10–30 minutes.

15. The combination according to claim 1, wherein the aluminum alloy forming said piston is an aluminum-silicon alloy.

* * * * *